United States Patent [19]
Blass et al.

[11] Patent Number: 5,527,167
[45] Date of Patent: Jun. 18, 1996

[54] SCROLL MACHINE SOUND ATTENUATION

[75] Inventors: Jaroslav Blass, Sidney; Neal G. Marchal, Russia; Gary J. Anderson, Sidney; Frank S. Wallis, Sidney; Kenneth J. Monnier, Sidney; Kent E. Logan, Englewood; Steven C. Fairbanks, Sidney, all of Ohio

[73] Assignee: Copeland Corporation, Sidney, Ohio

[21] Appl. No.: 523,853

[22] Filed: Sep. 5, 1995

Related U.S. Application Data

[60] Continuation of Ser. No. 317,670, Oct. 5, 1994, abandoned, which is a division of Ser. No. 147,113, Nov. 3, 1993, Pat. No. 5,403,172.

[51] Int. Cl.$^6$ .................................................. F01C 1/04
[52] U.S. Cl. ................................. 418/55.3; 464/102
[58] Field of Search .................. 418/55.3, 55.5, 418/57; 464/102–105

[56] References Cited

U.S. PATENT DOCUMENTS

| | | | |
|---|---|---|---|
| 2,475,247 | 7/1949 | Mikulasek | 418/55.3 |
| 4,300,875 | 11/1981 | Fischer et al. | 418/55.3 |
| 4,457,675 | 7/1984 | Inagaki et al. | 418/14 |
| 4,575,318 | 3/1986 | Blain | 418/14 |
| 4,580,956 | 4/1986 | Takahashi et al. | 418/14 |
| 4,610,610 | 9/1986 | Blain | 418/14 |
| 4,673,339 | 6/1987 | Hayano et al. | 418/15 |
| 4,708,607 | 11/1987 | Hayano et al. | 418/57 |
| 4,927,339 | 5/1990 | Riffe et al. | 418/53 |
| 4,927,340 | 5/1990 | McCullough | 418/57 |
| 4,992,033 | 2/1991 | Caillat et al. | 418/55.3 |
| 5,080,566 | 1/1992 | Sakata et al. | 418/55.3 |
| 5,320,506 | 6/1994 | Fogt | 418/55.3 |

FOREIGN PATENT DOCUMENTS

| | | | |
|---|---|---|---|
| 463370A2 | 1/1992 | European Pat. Off. | 418/55.3 |
| 315603A | 1/1991 | Japan | 418/55.3 |
| 364685A | 3/1991 | Japan | 418/55.3 |
| 4132888A | 5/1992 | Japan | 418/55.3 |
| 4175482A | 6/1992 | Japan | 418/55.3 |

*Primary Examiner*—John J. Vrablik
*Attorney, Agent, or Firm*—Harness, Dickey & Pierce

[57] ABSTRACT

A scroll-type machine has a motion controlling member for preventing relative rotation between a first and a second scroll member while allowing relative orbiting motion therebetween. The scroll-type machine includes a novel arrangement of a spring or other flexible member for biasing the motion controlling member in a specific direction. The biasing of the motion controlling member operates to reduce the mechanical impact noise or rattle which is caused by the vibration of the machine's operating components.

24 Claims, 9 Drawing Sheets

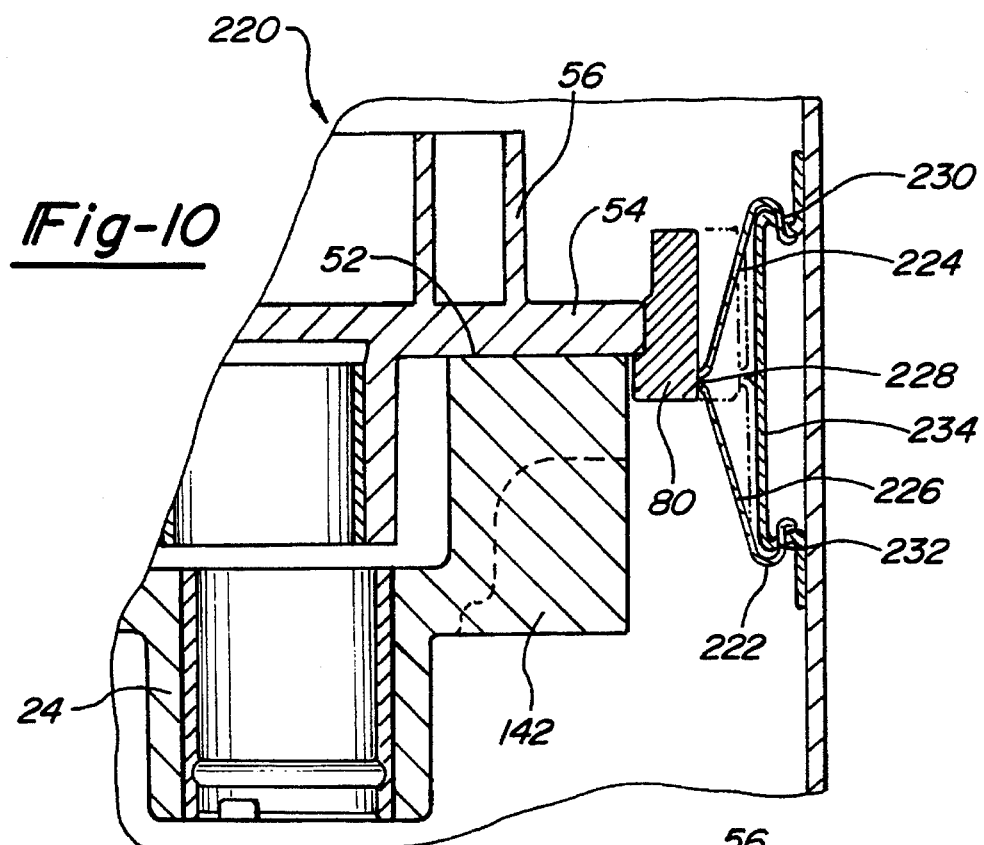
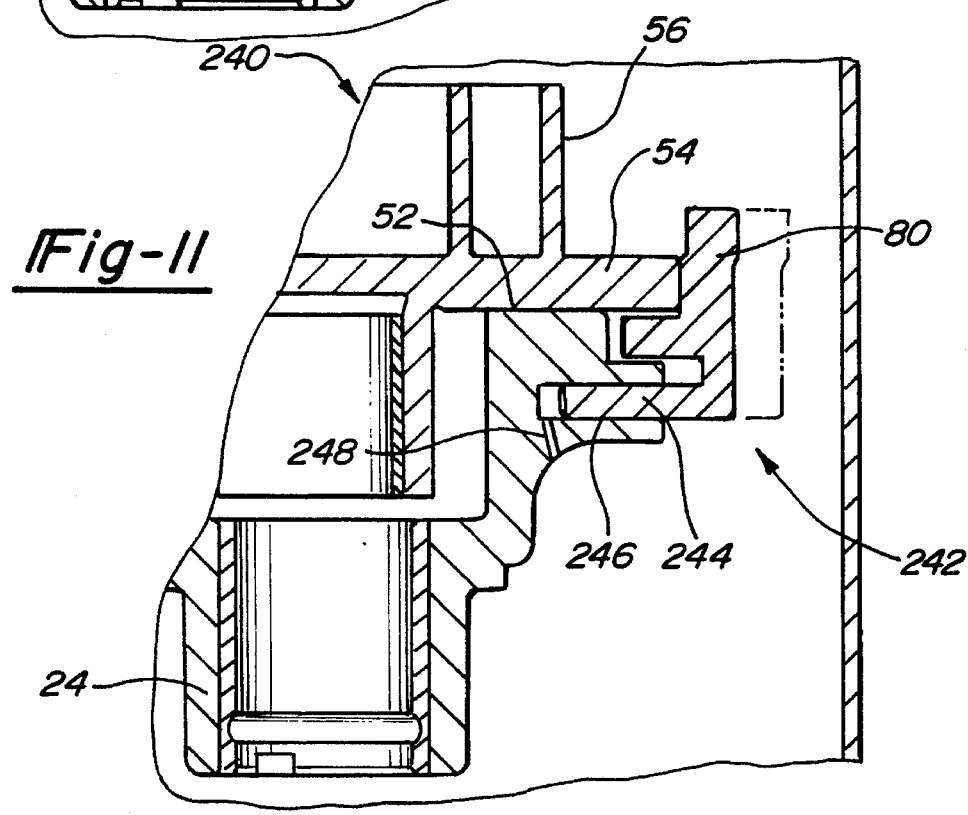

SCROLL MACHINE SOUND ATTENUATION

This is a continuation of U.S. patent application Ser. No. 08/317,670, filed Oct. 5, 1994, now abandoned, which is a division of pending prior application Ser. No. 08/147,113 filed Nov. 3, 1993 now U.S. Pat. No. 5,403,172 issued Apr. 4, 1995 entitled SCROLL MACHINE SOUND ATTENUATION.

FIELD OF THE INVENTION

The present invention relates to scroll-type machinery. More particularly, the present invention relates to a novel method and apparatus for attenuating noise generated during the operation of the scroll-type machinery.

BACKGROUND AND SUMMARY OF THE INVENTION

Scroll machinery for fluid compression or expansion is typically comprised of two upstanding interfitting involute spirodal wraps or scrolls which are generated about respective axes. Each respective scroll is mounted upon an end plate and has a tip disposed in contact or near contact with the end plate of the other respective scroll. Each scroll further has flank surfaces which adjoin, in moving line contact or near contact, the flank surfaces of the other respective scroll to form a plurality of moving chambers. Depending upon the relative orbital motion of the scrolls, the chambers move from the radially exterior ends of the scrolls to the radially interior ends of the scrolls for fluid compression, or from the radially interior ends of the scrolls to the radially exterior ends of the scrolls for fluid expansion. The scrolls, to accomplish the formation of the chambers, are put in relative orbital motion by a drive mechanism. Either one of the scrolls may orbit or both may rotate eccentrically with respect to one another.

A typical scroll machine, according to the design which has a non-orbiting scroll, includes an orbiting scroll which meshes with the non-orbiting scroll, a thrust bearing to take the axial loads on the orbiting scroll and a motion controlling member for preventing relative rotation of the scroll members. The motion controlling member preferred for preventing relative rotation of the scroll members is usually an Oldham coupling.

In the marketplace, there is an increasing demand for much quieter machinery than was hitherto acceptable, and this is especially true for air conditioning and heat pump systems. In the case of refrigerant compressors used for air conditioning and heat pump applications, sound has become an increasingly important criteria for judging acceptability. There are a number of identified sources of sound in a scroll compressor, many of which are relatively easily cured. A recently discovered source of sound which does not lend itself to easy cure, however, concerns the mechanical impact noise or rattle which is caused by vibration of the motion controlling member in relation to various components of the compressor under certain operating conditions. These operating conditions include when the compressor is operating under lighter load conditions when there is insufficient loading of the compressor components including the motion controlling member to prevent force reversals which can cause the motion controlling member to impact noisily on the components of the compressor with which it interfaces and conditions when the motion controlling member wobbles within the compressor as a result of the interaction between the drive loads, gas forces, thrust bearings or other components of the compressor.

Accordingly, it would be desirable to insure that there is sufficient loading of the motion controlling member in all directions and at all operating conditions of the compressor to prevent the force reversals and the wobbling of the motion control member and thus eliminate the mechanical impact or rattle which is caused by the vibration of the motion controlling member.

It is therefore a primary objective of the present invention to provide means for biasing the motion controlling member in order to take up the normal build and operating clearances that are present in the scroll machinery which can contribute to the mechanical impact or rattle caused by the vibration of the motion controlling member.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 10 is a schematic representation of the biasing of the motion controlling member using a leaf spring in accordance with another embodiment of the present invention;

FIG. 11 is a schematic representation of the biasing of the motion control member using a dashpot in accordance with another embodiment of the present invention;

DESCRIPTION OF THE PREFERRED EMBODIMENT

Figure 1:
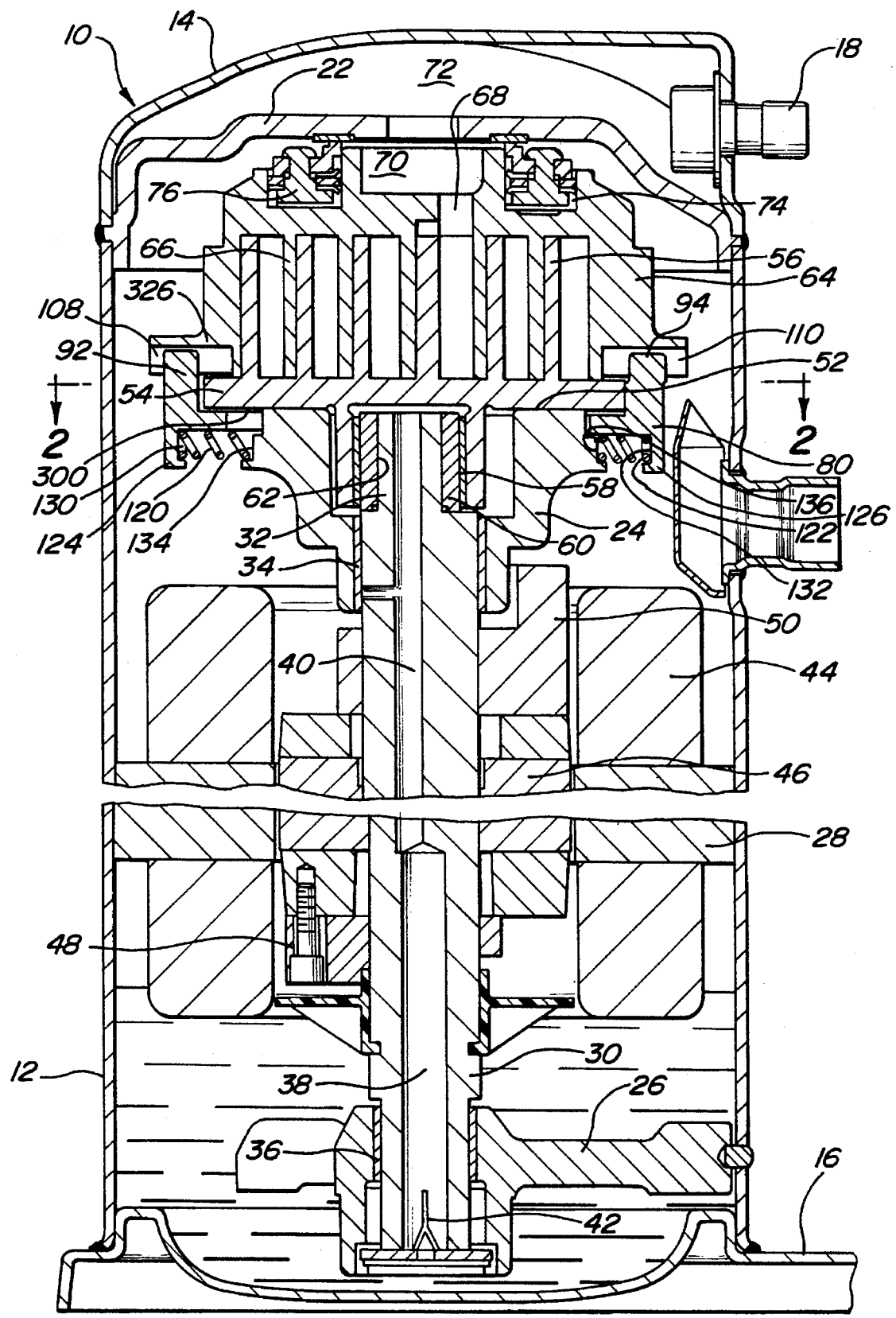
FIG. 1 is a vertical sectional view through the center of a scroll type refrigeration compressor incorporating a biased motion controlling member in accordance with the present invention.

Referring now to the drawings in which like reference numerals designate like or corresponding parts throughout the several views, there is shown in FIG. 1, a compressor 10 which comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22 which is welded about its periphery at the same point that cap 14 is welded to shell 12, a main bearing housing 24 which is suitably secured to shell 12 and a lower bearing housing 26 having a plurality of radially outwardly extending legs each of which is suitably secured to shell 12. A motor stator 28 which is generally square in cross-section but with the corners rounded off is press fitted into shell 12. The flats between the rounded corners on the stator provide passageways between the stator and shell which facilitate the return flow of lubricant from the top of the shell to the bottom.

A drive shaft or crankshaft 30 having an eccentric crank pin 32 at the upper end thereof is rotatably journaled in a bearing 34 in main bearing housing 24 and a second bearing 36 in lower bearing housing 26. Crankshaft 30 has at the lower end a relatively large diameter concentric bore 38 which communicates with a radially outwardly inclined smaller diameter bore 40 extending upwardly therefrom to the top of crankshaft 30. Disposed within bore 38 is a stirrer 42. The lower portion of the interior shell 12 is filled with lubricating oil and bore 38 acts as a pump to pump lubricating fluid up the crankshaft 30 and into passageway 40 and ultimately to all of the various portions of the compressor which require lubrication.

Crankshaft 30 is rotatively driven by an electric motor including stator 28, windings 44 passing therethrough and a rotor 46 press fitted on crankshaft 30 and having upper and lower counterweights 48 and 50, respectively.

The upper surface of main bearing housing 24 is provided with a flat thrust bearing surface 52 on which is disposed an orbiting scroll 54 having the usual spiral vane or wrap 56 on the upper surface thereof. Projecting downwardly from the lower surface of orbiting scroll 54 is a cylindrical hub having a journal bearing 58 therein and in which is rotatively disposed a drive bushing 60 having an inner bore 62 in which crank pin 32 is drivingly disposed. Crank pin 32 has a flat on one surface which drivingly engages a flat surface (not shown) formed in a portion of inner bore 62 to provide a radially compliant driving arrangement, such as shown in assignee's U.S. Pat. No. 4,877,382, the disclosure of which is hereby incorporated herein by reference.

A non-orbiting scroll member 64 is also provided having a wrap 66 positioned in meshing engagement with wrap 56 of scroll 54. Non-orbiting scroll 64 has a centrally disposed discharge passage 68 which communicates with an upwardly open recess 70 which in turn is in fluid communication with a discharge muffler chamber 72 defined by cap 14 and partition 22. An annular recess 74 is also formed in non-orbiting scroll 64 within which is disposed a floating seal assembly 76. Recesses 70 and 74 and seal assembly 76 cooperate to define axial pressure biasing chambers which receive pressurized fluid being compressed by wraps 56 and 66 so as to exert an axial biasing force on non-orbiting scroll member 64 to thereby urge the tips of respective wraps 56 and 66 into sealing engagement with the opposed end plate surfaces. Seal assembly 76 is preferably of the type described in greater detail in U.S. Pat. No. 5,156,539, the disclosure of which is hereby incorporated herein by reference. Scroll member 64 is designed to be mounted to main bearing housing 24 in a suitable manner such as disclosed in the aforementioned U.S. Pat. No. 4,877,382 or U.S. Pat. No. 5,102,316, the disclosure of which is hereby incorporated herein by reference.

An Oldham coupling 80 is provided as a motion controlling member and is positioned between orbiting scroll 54 and bearing housing 24. Oldham coupling 80 is keyed to both orbiting scroll 54 and non-orbiting scroll 64 to prevent rotational movement of orbiting scroll member 54 with respect to non-orbiting scroll 64. Oldham coupling 80 is preferably similar to the type disclosed in assignee's copending application Ser. No. 591,443, entitled "Oldham Coupling For Scroll Compressor" filed Oct. 1, 1990, the disclosure of which is hereby incorporated herein by reference.

Figure 3:
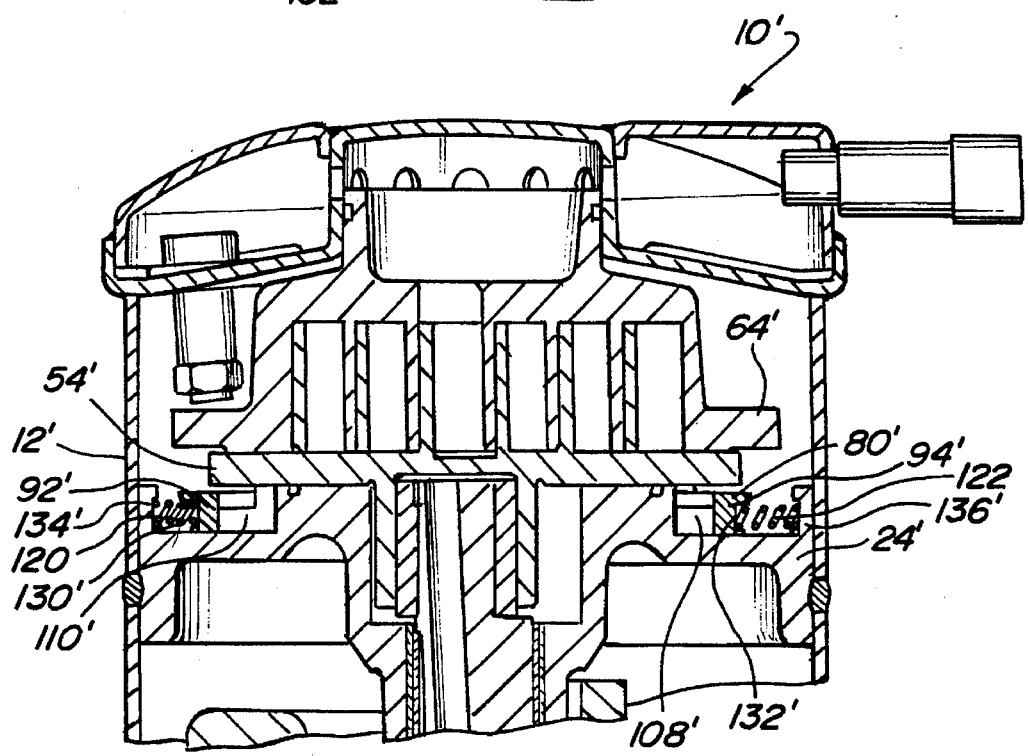
FIG. 3 is a fragmentary vertical section view similar to that of FIG. 1 but incorporating a different design of motion controlling member which is biased similar to that shown in FIG. 1.

FIG. 3 illustrates the upper portion of a compressor 10' which includes a shell 12' and an Oldham coupling 80' which is provided as a motion controlling member and is positioned between an orbiting scroll 54' and a bearing housing 24'. Oldham coupling 80' is keyed to both orbiting scroll 54' and bearing housing 24' to prevent rotational movement of orbiting scroll member 54' with respect to a non-orbiting scroll 64'. Oldham coupling 80' is preferably similar to the type disclosed in assignee's U.S. Pat. No. 4,992,033, the disclosure of which is hereby incorporated herein by reference.

The present invention provides a unique arrangement for biasing Oldham coupling 80 or Oldham coupling 80' with respect to orbiting scroll 54 or 54', non-orbiting scroll 64 or 64', main bearing housing 24 or 24' or shell 12 or 12'. Oldham coupling 80, as best seen with reference to FIGS. 2, 4 and 5, includes an annular ring portion 82, the inner periphery of which is non-circular in shape being defined by two generally circular arc segments 84 and 86 each of a substantially constant radius R, the opposed ends of which are interconnected by substantially straight segments 88 and 90 of length L.

A pair of keys 92 and 94 are provided on annular ring 82 in diametrically aligned relationship and projecting axially upward from a surface 96 thereof. A second pair of keys 98 and 100 are also provided on annular ring 82 also projecting axially upward from surface 96 thereof. Keys 98 and 100 are aligned along a line extending parallel to a radius of arc 86 which radius is substantially perpendicular to the diameter along which keys 92 and 94 are aligned but shifted towards key 94. Additionally, keys 98 and 100 are positioned on outwardly projecting flange portions. Both the radial shifting and outward positioning of keys 98 and 100 cooperate to enable the size of Oldham coupling 80 to be kept to a minimum for a given size compressor and associated shell diameter while enabling the size of thrust surface 52 to be maximized for this same compressor as well as to avoid interference with the location and extent of wrap 56 of orbiting scroll member 54.

Figure 2:
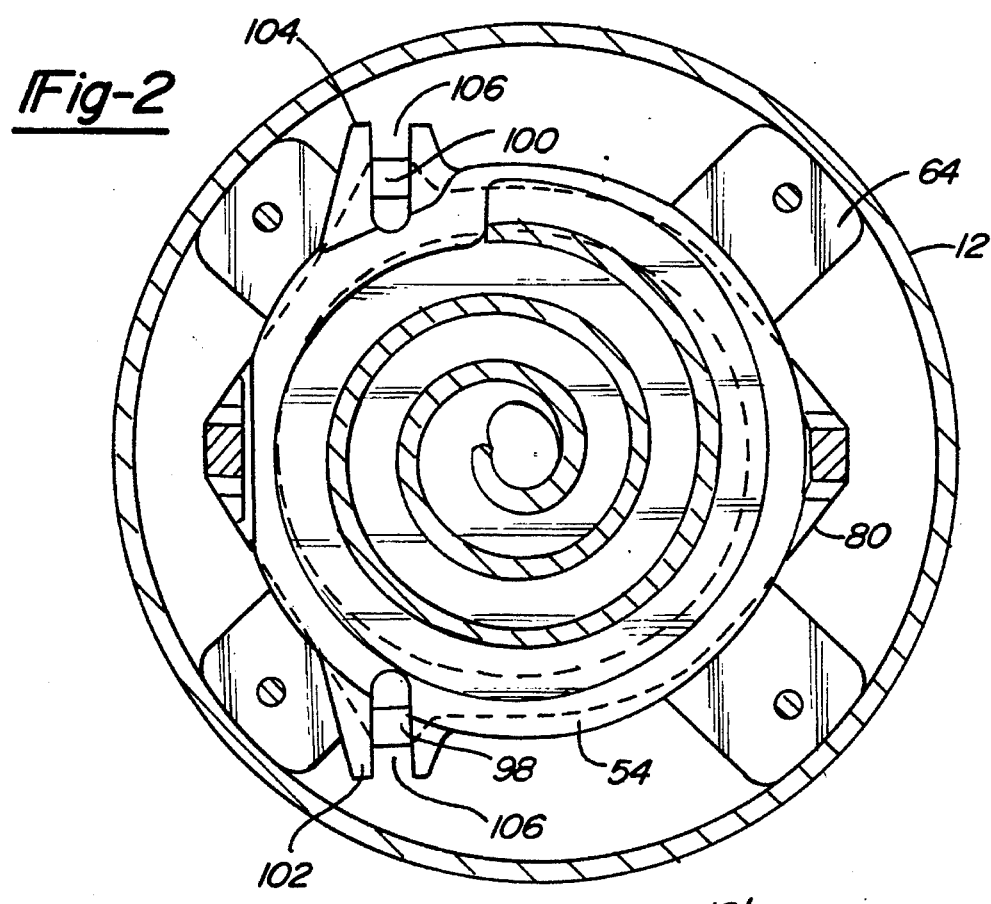
FIG. 2 is a sectional view of the refrigeration compressor of FIG. 1, the section being taken along line 2—2 thereof.

As shown in FIG. 2, the end plate of orbiting scroll member 54 is provided with a pair of outwardly projecting flange portions 102 and 104 each of which is provided with an outwardly opening slot 106. Slots 106 are sized to slidingly receive respective keys 98 and 100. Keys 98 and 100 will, of course, have an axial length or height so as to avoid projecting above the upper surface of the end plate of orbiting scroll member 54.

Referring once again to FIG. 1, non-orbiting scroll 64 is similarly provided with a pair of radially extending aligned slots 108 and 110 which are designed to receive respective keys 92 and 94. Of course, keys. 92 and 94 will be substantially longer than the keys 98 and 100 and of sufficient length to project above the end plate of scroll 54 and remain in engagement with slots 108 and 110 throughout the limited axial movement of non-orbiting scroll 64 noted above. It should be noted, however, that preferably a slight clearance will be provided between the end of respective keys 92 and 94 and the overlying surfaces of respective slots 108 and 110 when scroll member 64 is fully seated against scroll member 54 thereby avoiding any possibility of interference with the tip sealing between the respective scroll members.

As may now be appreciated, Oldham coupling 80 serves to directly interconnect and prevent any relative rotation between scroll members 54 and 64 through the cooperative action of the abutment surfaces provided by respective slots 106, 108 and 110 and associated keys 98, 100, 92, and 94. Similarly, the mounting arrangement of non-orbiting scroll 64 to bearing housing 24 will operate to effectively prevent relative rotation of non-orbiting scroll member 64 with respect to bearing housing 24 and hence also prevent relative rotation of orbiting scroll member 54 with respect to bearing housing 24.

The present invention utilizes a biasing member for applying load to Oldham coupling 80 in order to take up the manufacturing build and operating clearances. Oldham key loads are affected by many factors, but primarily, there are two major influences. These two influences include the tangential gas force and the resulting moment it creates and the inertia induced forces caused by the translational movement of the Oldham ring. The tangential gas force moment is dependent on operating conditions for the compressor but it can be considered quite uniform. It produces forces on orbiting scroll keys 98 and 100 as shown by $F_o$ in FIG. 4. The translational inertia is dependent on operating speed and is sinusoidal in nature. It affects only the orbiting scroll keys 98 and 100 and produces forces as shown by $F_I$ in FIG. 4. $F_I$ is a sinusoidal force which cycles between a positive and a negative value. Thus, the inertial forces $F_I$ both add and subtract from the tangential moment forces $F_o$ on orbiting scroll keys 98 and 100. The inertial forces $F_I$ do not directly affect the forces acting on non-orbiting keys 92 and 94.

Figure 4:
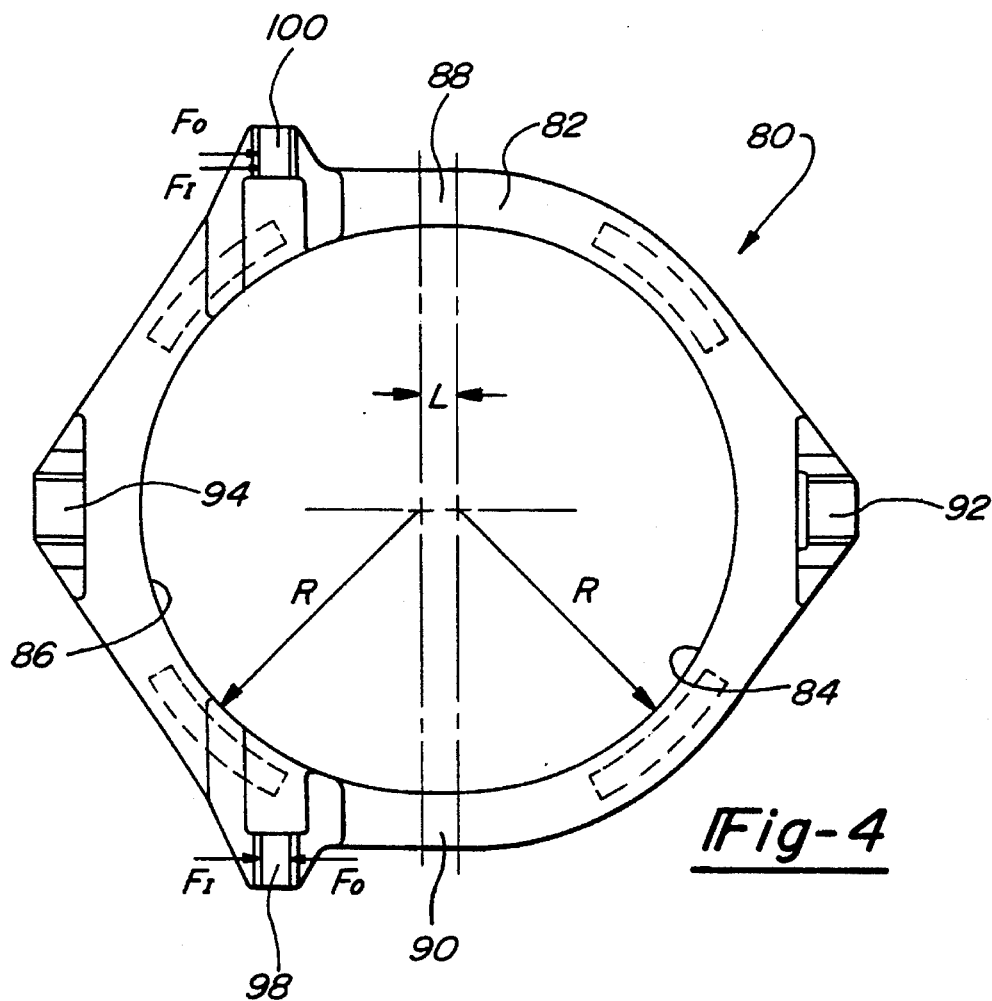
FIG. 4 is a plan view of the motion controlling member incorporated in the refrigeration compressor shown in FIGS. 1 and 2, all in accordance with the present invention.
Figure 4A:
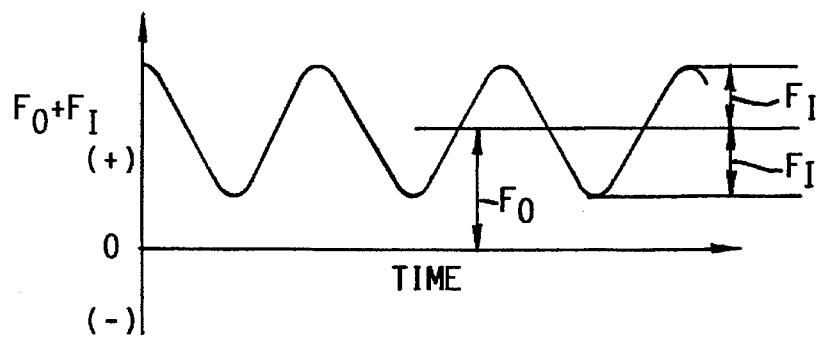
FIG. 4A is a graph depicting the combination of tangential gas forces and inertial gas forces acting on the motion controlling member in a first condition.
Figure 4B:
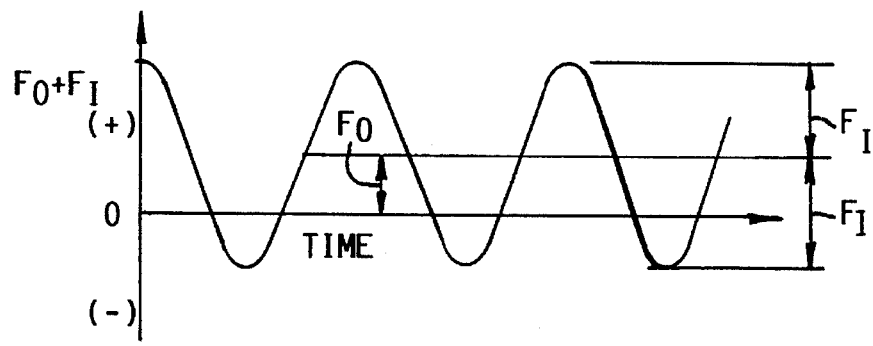
FIG. 4B is a graph depicting the combination of tangential gas forces and inertial gas forces acting on the motion controlling member in a second condition.

FIG. 4A shows a summation of the two forces $F_o$ and $F_I$ when the value of $F_I$ is less than the value of $F_o$. In this case, orbiting scroll keys 98 and 100 remained biased against one side of their respective slots 106. FIG. 4B shows a summation where the value of $F_I$ is greater than the value of $F_o$. In this case, the loading on orbiting scroll keys 98 and 100 becomes negative for an instant during each rotation. This causes orbiting scroll keys 98 and 100 to vibrate within their respective slots 106 creating undesirable noise. The introduction of a single spring or a plurality of springs to directly oppose the inertial force component will ensure that keys 98 and 100 will never experience negative forces and thus not create the undesirable noise.

The embodiment shown in FIGS. 1 and 2 shows a pair of coil springs 120 and 122 disposed between main bearing housing 24 and Oldham coupling 80. A fifth and sixth key 124 and 126 are provided on Oldham coupling 80 projecting axially from a surface 128 thereof in a direction opposite from keys 92, 94, 98 and 100. Keys 124 and 126 respectively define pockets 130 and 132 for receiving coil springs 120 and 122 respectively. A corresponding pair of pockets 134 and 136 are located within main bearing housing 24. Pockets 130 and 134 operate to retain and guide coil spring 120 while pockets 132 and 136 operate to retain and guide coil spring 122. FIG. 3 shows a similar biasing for Oldham coupling 80'.

While FIGS. 1 and 2 illustrate Oldham coupling 80 that is biased by two coil springs 120 and 122 operating in opposite directions, it is within the scope of the present invention to only use coil spring 120 to bias Oldham coupling 80. The direction of biasing would then be determined by the spring type of coil spring 120. If coil spring 120 is selected to be a compression spring, the biasing of Oldham coupling 80 with respect to main bearing housing 24 will be radially outward. If coil spring 120 is selected to be an extension spring, the biasing of Oldham coupling 80 with respect to main bearing housing 24 will be radially inward. In the case of an extension spring, the opposite ends of coil spring 120 would have to be attached to Oldham coupling 80 and main bearing housing 24, respectively. Coil springs 120 and 122 are also shown in FIG. 3 biasing Oldham coupling 80' in a manner identical to that described above for Oldham coupling 80.

Figure 18:
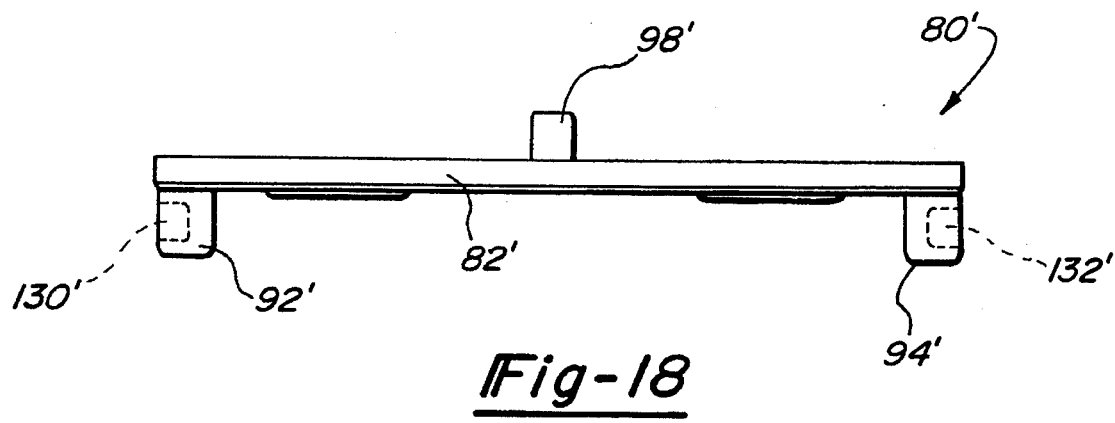
FIG. 18 is an elevational view of the motion controlling member shown in FIG. 17.
Figure 17:
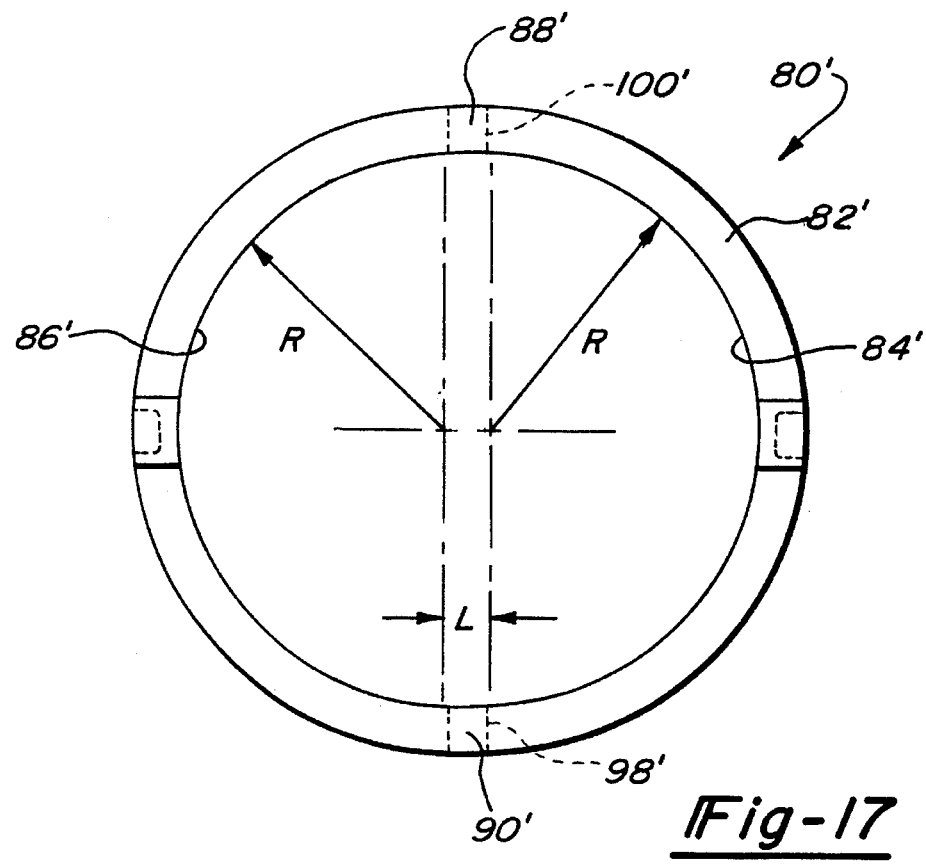
FIG. 17 is a plan view of the motion controlling member incorporated in the refrigeration compressor shown in FIG. 3.

Oldham coupling 80', as best seen with reference to FIGS. 3, 17 and 18, includes an annular ring portion 82', the inner periphery of which is non-circular in shape being defined by two generally circular arc segments 84' and 86' each of a substantially constant radius R, the opposed ends of which are interconnected by substantially straight segments 88' and 90' of length L.

A pair of keys 92' and 94' are provided on annular ring 82' in diametrically aligned relationship and projecting axially downwardly from annular ring 82'. A second pair of keys 98' and 100' are provided on annular ring 82' in diametrically aligned relationship and projecting axially upwardly from annular ring 82'.

Referring now to FIG. 3, bearing housing 24' has a pair of radially extending aligned slots 108' and 110' which are designed to receive keys 92' and 94'. In a similar manner to that shown in FIG. 2, keys 98' and 100' are slidingly received in a pair of slots (not shown) in orbiting scroll 54' and bearing housing 24'.

The present invention utilizes coil springs 120 and 122 for applying load to Oldham Coupling 80' in order to take up the manufacturing, build and operating clearances similar to the embodiment disclosed in FIG. 1. The embodiment shown in FIG. 3 shows coil springs 120 and 122 disposed between main bearing housing 24' and Oldham coupling 80'. A pair of pockets 130' and 132' for receiving coil springs 120 and 122, respectively, are formed in downwardly extending keys 92' and 94'. A corresponding pair of pockets 134' and 136' are located within main bearing housing 24'. Pockets 130' and 134' operate to retain and guide coil spring 120 while pockets 132 and 136 operate to retain and guide coil spring 122.

For illustration purposes only, FIGS. 6 through 12 will illustrate various types of a biasing member acting on one side of Oldham coupling 80. It is to be understood that each biasing member illustrated in FIGS. 6 through 12 can act independently to bias Oldham coupling 80 or it can be combined with an additional biasing member acting in the opposite direction similar to the embodiment depicted in FIGS. 1 and 2. In addition, it is to be understood that the biasing members illustrated in FIGS. 6 through 12 may also be incorporated into the scroll compressor illustrated in FIG. 3 to bias Oldham coupling 80' similar to the way in which Oldham coupling 80 is biased.

Figure 6:
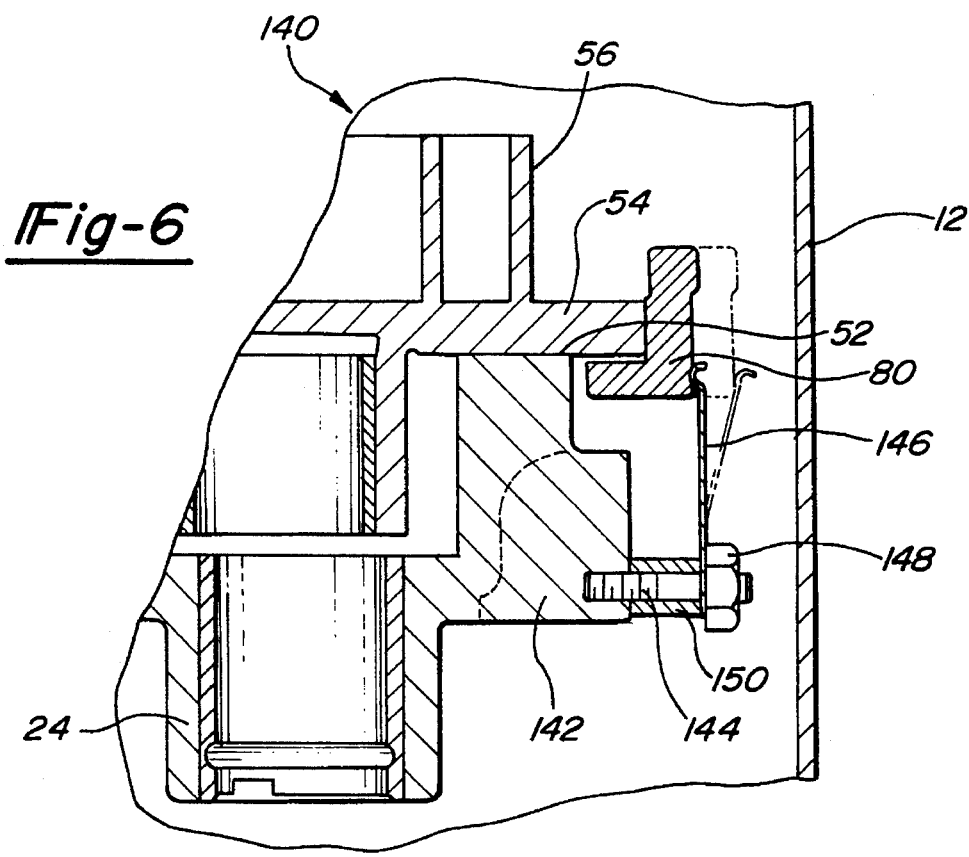
FIG. 6 is a schematic representation of the biasing of the motion controlling member using a cantilevered spring in accordance with another embodiment of the present invention.

FIG. 6 shows another embodiment of the biasing member of the present invention which is designated generally by the reference numeral 140. In the embodiment shown in FIG. 6, main bearing housing 24 is provided with an enlarged boss 142 which extends radially outward from main bearing housing 24 and provides a mounting area for biasing member 140. A support bolt 144 is fixedly secured to boss 142 by being threadingly received into a bore extending into boss 142 or support bolt 144 can be secured to boss 142 by other methods known well in the art. A cantilever spring 146 is attached to support bolt 144 by a nut 148 threadingly received on bolt 144 or by other means known well in the art. A spacer 150 positions cantilever spring 146 axially on support bolt 144. Cantilever spring 146 extends between support bolt 144 and the outside surface of Oldham coupling 80 to bias Oldham coupling 80 radially inward. Again it is possible to bias Oldham coupling 80 radially outward by attaching cantilever spring 146 to Oldham coupling 80 or by having cantilever spring 146 extend between support bolt 144 and the inside surface of Oldham coupling 80 if desired.

Figure 7:
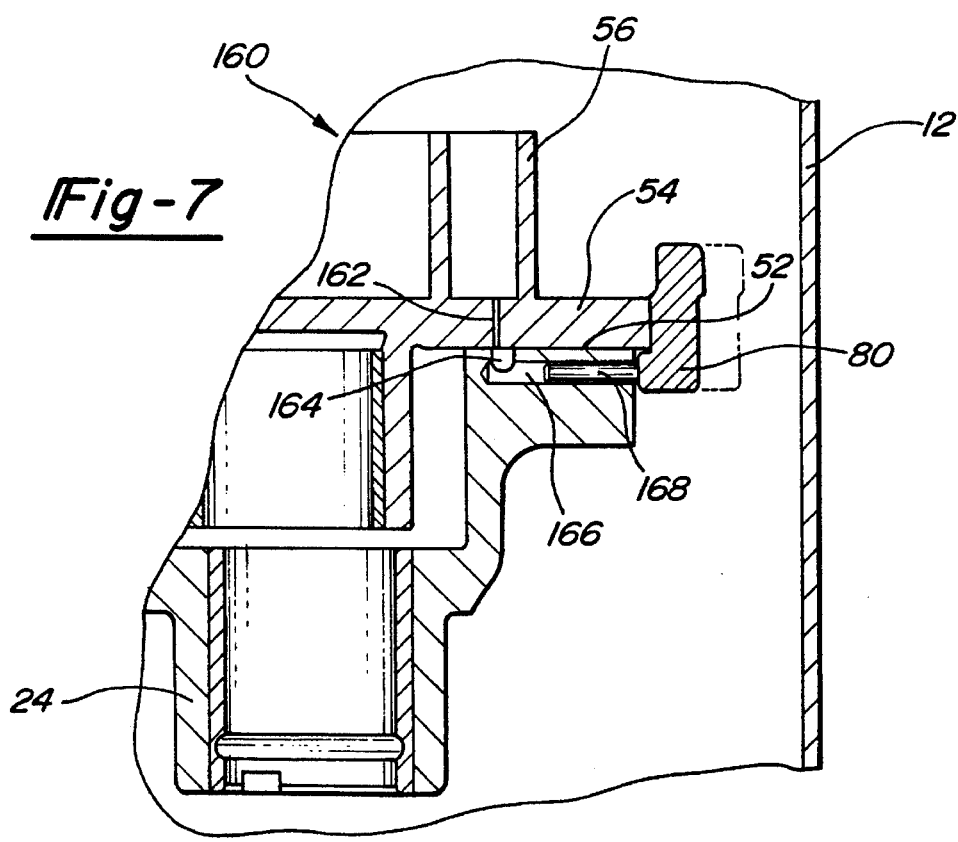
FIG. 7 is a schematic representation of the biasing of the motion controlling member using a compressible fluid spring in accordance with another embodiment of the present invention.

FIG. 7 shows another embodiment of the biasing member of the present invention which is designated generally by the reference numeral 160. Biasing member 160 is a piston and compressible fluid type of spring and comprises an intermediate pressure passageway 162 located through orbiting scroll member 54, an annular groove 164 disposed within thrust surface 52 of main bearing housing 24, an intermediate pressure biasing chamber 166 and a piston 168. Biasing chamber 166 is supplied with fluid at an intermediate pressure through groove 164 which is in turn supplied with fluid at intermediate pressure through passageway 162. Passageway 162 is open to an intermediate pressure area within compressor 10 at its upper end and is periodically open to groove 164 at its lower end during the operation of compressor 10. Piston 168 is slidingly received within chamber 166 such that the pressurized fluid within chamber 166 urges piston 168 radially outward against Oldham coupling 80 to provide the biasing of Oldham coupling 80.

Figure 8:
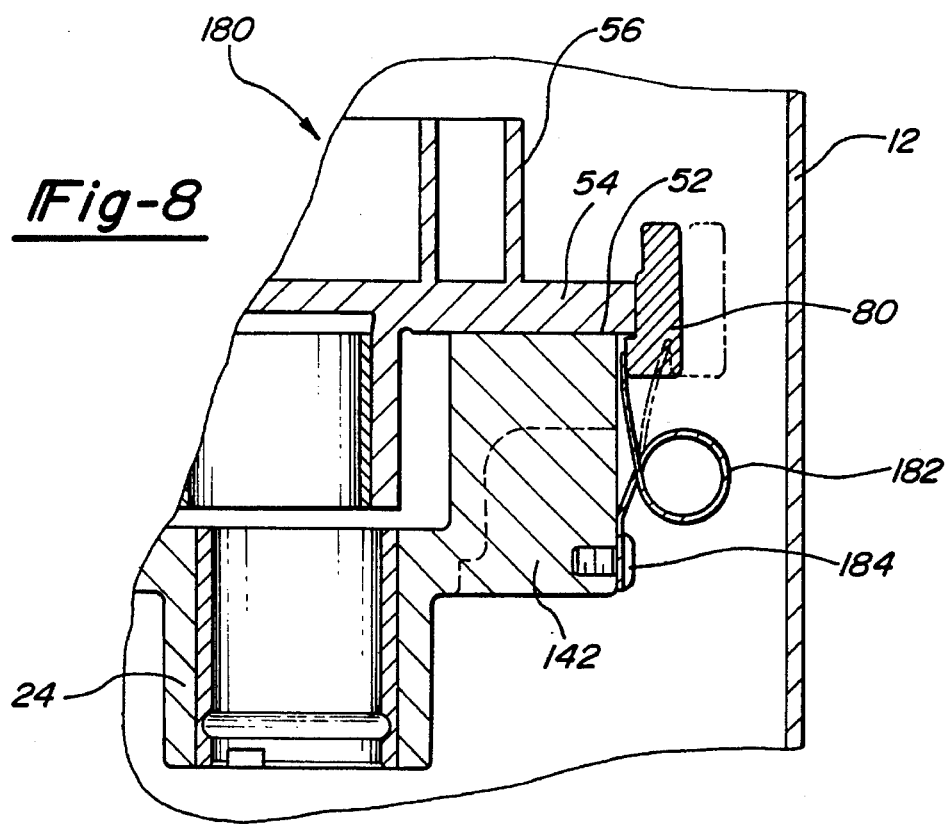
FIG. 8 is a schematic representation of the biasing of the motion controlling member using a loop spring in accordance with another embodiment of the present invention.

FIG. 8 shows another embodiment of the biasing member of the present invention which is designated generally by the reference numeral 180. Biasing member 180 comprises a loop spring 182 having one end fixedly secured to main bearing housing 24 by a retainer 184. Retainer 184 may be threadingly received into a bore within main bearing housing 24 or retainer 184 may be secured to main bearing housing 24 by other means known well in the art. The opposite end of loop spring 182 contacts the inside surface of Oldham coupling 80 and exerts a biasing load radially outward against Oldham coupling 80. While the present embodiment is being shown as biasing Oldham coupling 80 radially outward, it will be appreciated that loop spring 182 could be configured to contact the outside surface of Oldham coupling 80 and thus bias Oldham coupling 80 radially inward if desired.

Figure 9:
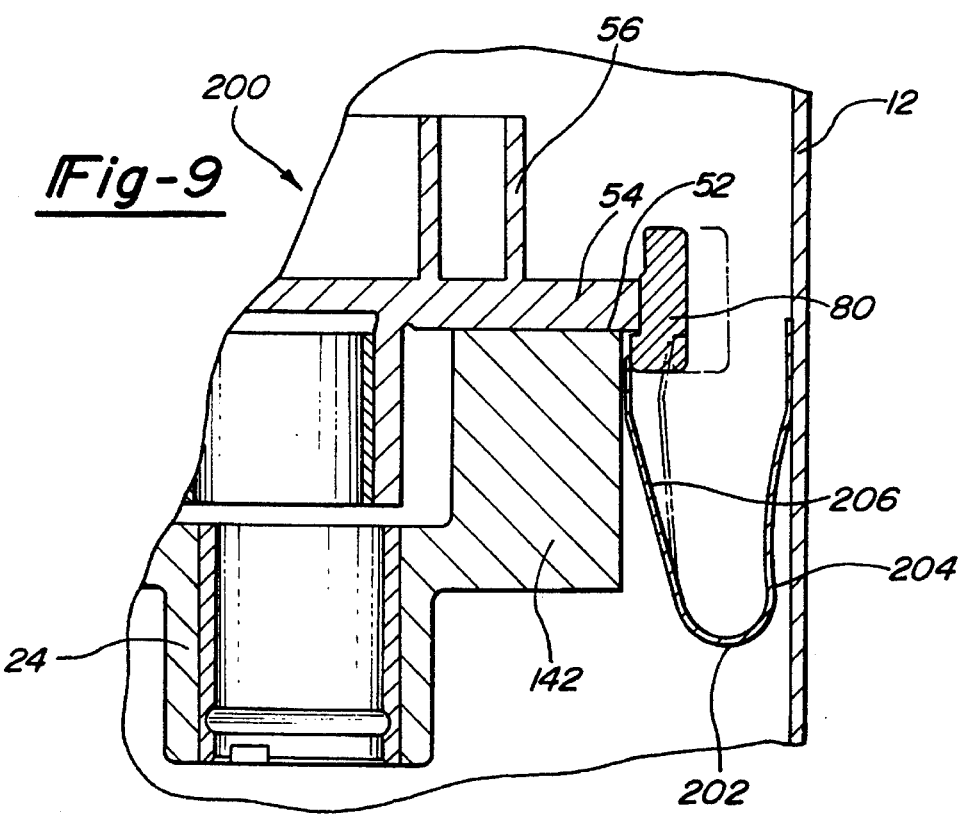
FIG. 9 is a schematic representation of the biasing of the motion controlling member using a wishbone spring in accordance with another embodiment of the present invention.

FIG. 9 shows another embodiment of the biasing member of the present invention which is designated generally by the reference numeral 200. Biasing member 200 comprises a wishbone spring 202 having a first leg 204 fixedly secured to shell 12 by welding or by other means known well in the art and a second leg 206 which contacts the internal surface of Oldham coupling 80 to bias Oldham coupling 80 radially outward. While being shown as biasing Oldham coupling 80 radially outward, it will be appreciated that wishbone spring 202 could be configured to contact the outside surface of Oldham coupling 80 and thus bias Oldham coupling 80 radially inward if desired. Also, while wishbone spring 202 is being shown in a generally vertical position, parallel to the axis of crankshaft 30, it is to be understood that wishbone spring 202 can be located at any angular position relative to the axis of crankshaft 30 in order to position wishbone spring 202 in the available space within shell 12.

FIG. 10 shows another embodiment of the biasing member of the present invention which is designated generally by the reference numeral 220. Biasing member 220 comprises a leaf spring 222 having a first leg 224, a second leg 226 and a central actuator portion 228. First and second legs 224 and 226 fit within corresponding apertures 230 and 232 located within a mounting bracket 234. Mounting bracket 234 is fixedly secured to shell 12 by welding or by other means known well in the art. The mounting of leaf spring 222 onto mounting bracket 234 positions central actuator portion 228 against the exterior surface of Oldham coupling 80 to bias Oldham coupling 80 radially inward. While mounting bracket 234 and leaf spring 232 are being shown in a generally vertical position parallel to the axis of crankshaft 30, it is to be understood that mounting bracket 234 and leaf spring 222 can be located at any angular position relating to the axis of crankshaft 30 in order to position mounting bracket 234 and leaf spring 222 in the available space within shell 12.

The various embodiments illustrated in FIGS. 1 through 10 illustrate the introduction of a biasing member to directly oppose the inertial force component acting on Oldham coupling 80 or 80'. The embodiment shown in FIG. 11 illustrates the introduction of a dashpot which opposes the translational motion of Oldham coupling 80 and thus acts as a biasing member.

FIG. 11 schematically shows another embodiment of the biasing member of the present invention which is designated generally by the reference numeral 240. Biasing member 240 comprises a dashpot 242 having a piston 244 integral with Oldham coupling 80 which is received in a cylinder 246 integral with lower bearing housing 24. Piston 244 is slidingly received within cylinder 246 and is sized such that axial motion of piston 244 within cylinder 246 causes a pumping action of suction gas within the compressor through a vent hole 248. If necessary, a seal (not shown) can be provided between cylinder 246 and piston 244 to insure the pumping of suction gas through vent hole 248. Vent hole 248 is sized to control gas flow into and out of cylinder 246 to allow for the negating of the inertial forces over a wide range of operating speeds of the compressor. In a similar manner, dashpot 242 may be incorporated into the compressor shown in FIG. 3 to bias Oldham coupling 80' similar to the way in which Oldham coupling 80 is biased.

Figure 12:
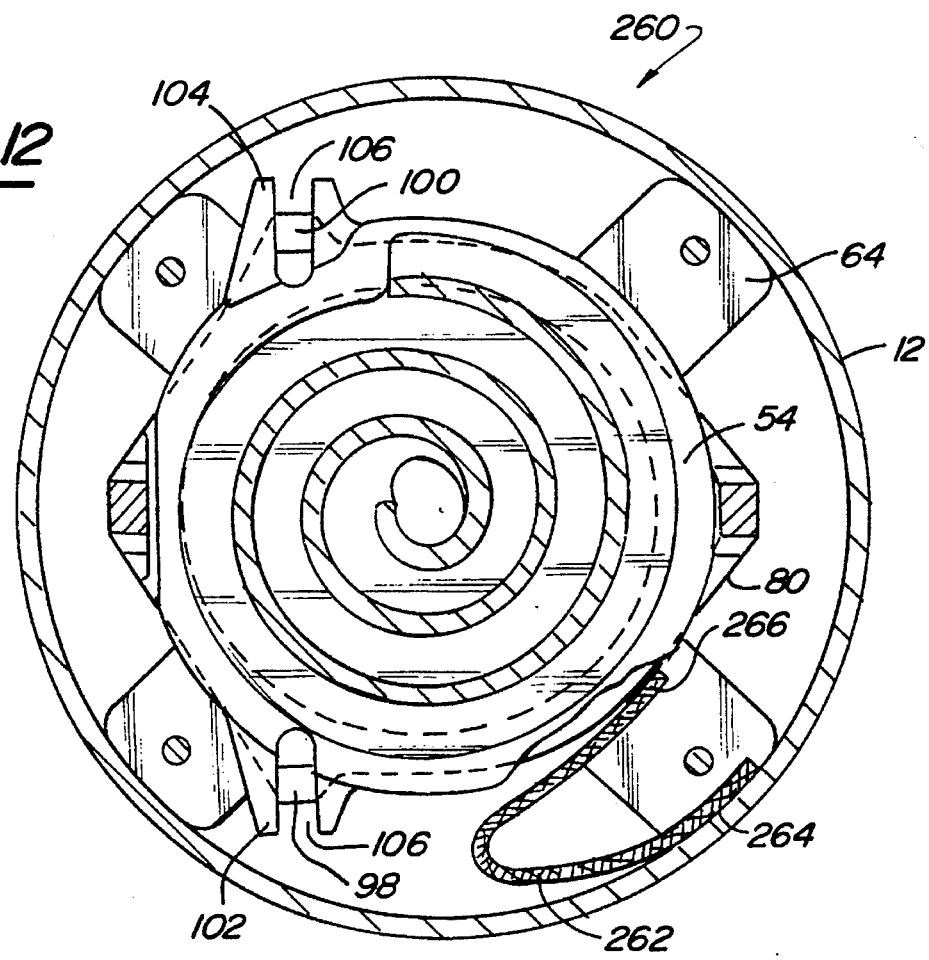
FIG. 12 is a sectional view similar to that shown in FIG. 2 but showing the biasing of the motion control member torsionally using a U-shaped spring in accordance with another embodiment of the present invention.

The various embodiments shown in FIGS. 1 through 11 illustrate the introduction of a biasing or damping member to directly oppose the inertial force component acting on Oldham coupling 80 or 80'. The embodiment shown in FIG. 12 illustrates the introduction of a biasing member which compliments or adds to the moment acting on Oldham coupling 80 by the tangential gas forces. By increasing the moment acting on Oldham coupling 80, the situation depicted in FIG. 4B can be avoided and the loading on Oldham coupling 80 will always be similar to that depicted in FIG. 4A.

FIG. 12 shows another embodiment of the biasing member of the present invention which is designated generally by the reference numeral 260. Biasing member 260 comprises a U-shaped torsional spring 262 which is fixedly secured to shell 12 at 264 and to Oldham coupling 80 at 266. U-shaped spring 262 may be a braided cable or any other type of U-shaped spring. Once assembled between shell 12 and Oldham coupling 80, spring 262 is preloaded in a torsional direction by the assembling of Oldham coupling 80 into compressor 10. U-shaped torsional spring 262 thus allows Oldham coupling 80 to move freely in its translational movement while providing load in a torsional direction due to the U-looping of spring 262.

Figure 5:
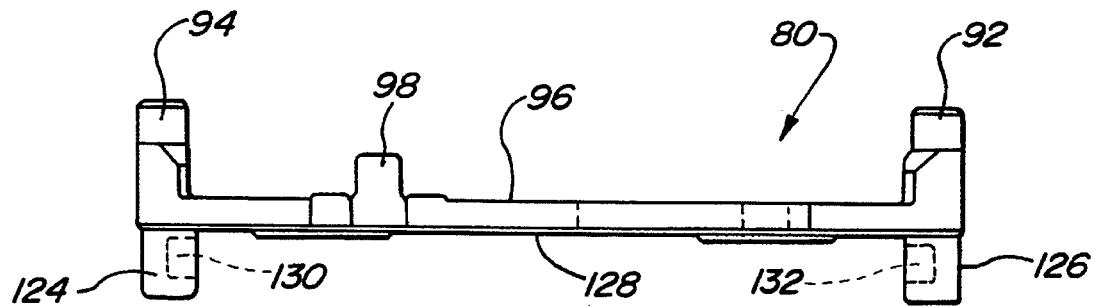
FIG. 5 is an elevational view of the motion controlling member shown in FIG. 4.

Orbiting scroll 54, in addition to its normal orbiting motion, wobbles as a result of the interaction between the drive loads, gas forces and thrust bearings. This wobbling action of orbiting scroll 54 in conjunction with Oldham key friction with their respective slots tends to impact some wobbling to Oldham coupling 80. In addition, inertial forces also work to move Oldham coupling 80 vertically. As shown in FIGS. 4 and 5, Oldham coupling 80 is designed such that the forces acting on the Oldham keys is not in the same horizontal plane as the center of mass of Oldham coupling 80. Because of this, a couple is created by the inertia and driving forces tending to cause rotation of Oldham coupling 80. In an effort to reduce or eliminate the wobbling of Oldham coupling 80, a biasing member can be incorporated to bias Oldham coupling 80 in an axial direction.

The biasing members previously described in FIGS. 1 through 12 bias the Oldham coupling in a specified direction, either radially or torsionally with respect to the compressor, in order to eliminate the noise or rattle caused by the keys of the Oldham coupling slapping against their respective slots whether these slots be located in the orbiting scroll, the non-orbiting scroll or the lower bearing housing. The embodiments shown in FIGS. 13 through 16 illustrate biasing of the Oldham coupling where the specified direction is axially with respect to the compressor.

Figure 13:
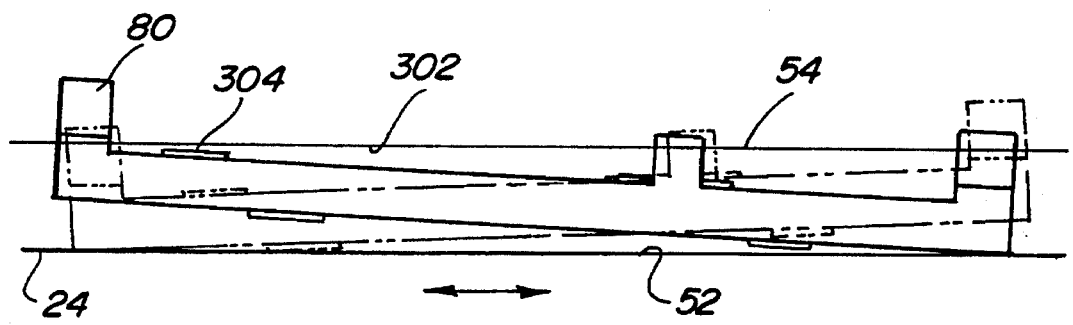
FIG. 13 is a schematic illustration of the orbiting scroll, the Oldham coupling and the main bearing housing accentuating the wobbling of the Oldham coupling.

FIG. 13 schematically represents the assembly of Oldham coupling 80, orbiting scroll 54 and lower bearing housing 24. Oldham coupling 80 is located between two horizontal and generally parallel surfaces. These two surfaces are the lower surface 302 of orbiting scroll 54 and flat thrust bearing surface 52 of main bearing housing 24. Vertical motion of Oldham coupling 80 is limited by contact of a plurality of Oldham pads 304 disposed on Oldham coupling 80 which contacts these two surfaces 302 and 52. Oldham coupling 80 is guided in its translational movement by non-orbiting scroll keys 92 and 94 while being driven by orbiting scroll keys 98 and 100. As Oldham coupling 80 is driven, inertial and frictional forces tend to cause the plurality of Oldham pads 304 to intermittently contact surfaces 302 and 52. Each time a pad 304 makes contact with either surface 302 or surface 52, the impact contributes to the overall sound level of compressor 10. The embodiments shown in FIGS. 14 through 16 bias Oldham coupling 80 against one of the surfaces 302 or 52 to control the magnitude of the impact between pads 304 and either surface 302 or surface 52.

Figure 14:
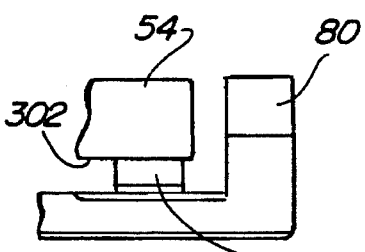
FIG. 14 is a partial side elevational view showing the axial biasing of the motion control member using a leaf spring in accordance with another embodiment of the present invention.
Figure 15:
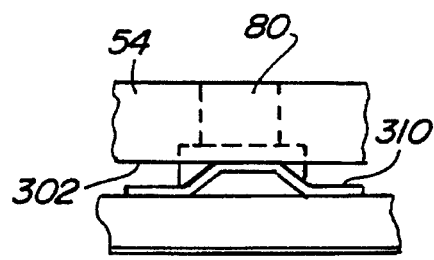
FIG. 15 is a partial end view of the biasing of the motion control member shown in FIG. 14.

FIGS. 14 and 15 illustrate schematically the use of a leaf spring 310 to bias Oldham coupling 80 in an axial direction. Leaf spring 310 is disposed between Oldham coupling 80 and surface 302 on orbiting scroll 54 to bias Oldham coupling 80 towards surface 52 on main bearing housing 24. Depending on the quantity and rate of leaf spring 310, the wobbling of Oldham coupling may be reduced or eliminated as Oldham coupling 80 is biased against surface 52 of main bearing housing 24. Leaf spring 310 may be fixedly secured to Oldham coupling 80 or may be located within a recess (not shown) in Oldham coupling 80 in order to resist the relative motion between orbiting scroll 54 and Oldham coupling 80.

Figure 16:
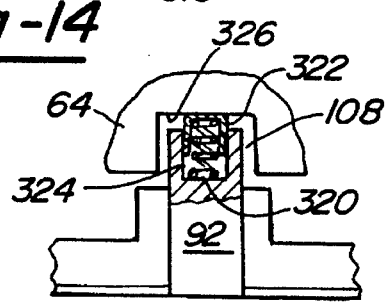
FIG. 16 is a partial end view showing the axial biasing of the motion control member using a coil spring in accordance with another embodiment of the present invention.

FIG. 16 illustrates schematically the use of a coil spring 320 and a button 322 located within a bore 324 extending axially into non-orbiting scroll keys 92 of Oldham coupling 80. While FIG. 16 schematically illustrates coil spring 320 and button 322 within scroll key 92, it is to be understood that a similar coil spring 320 and button 322 may be incorporated into scroll key 94 to maintain symmetrical loading of Oldham coupling 80 if desired. Coil spring 320 urges button 322 into contact with the upper surface 326 of slot 108 located in non-orbiting scroll 64. In this manner, Oldham coupling 80 is biased towards surface 52 on main bearing housing 24. In order to symmetrically load Oldham coupling 80, both non-orbiting scroll keys 92 and 94 would include bore 324, coil spring 320 and button 322. Depending on the rate of coil springs 320, the wobbling of Oldham coupling 80 may be reduced or eliminated as Oldham coupling 80 is biased against surface 52 of main bearing housing 24. Button 322 allows for the translational movement of Oldham coupling 80 within slots 108.

While the above description of the preferred embodiments have been shown for exemplary purposes associated with a specific design of Oldham coupling, it is to be appreciated that one skilled in the art can modify the biasing means of the present invention to be used with other designs of Oldham couplings without departing from the scope, spirit and fair meaning of the present invention, as defined in the subjoined claims.

What is claimed is:

1. A scroll-type machine comprising:

a first scroll member having a second spiral wrap projecting outwardly from an end plate;

a second scroll member having a second spiral wrap projecting outwardly from an end plate, said second spiral wrap interleaved with said first spiral wrap to define a plurality of moving fluid chambers therebetween upon relative orbital movement of said scroll members;

a drive shaft rotatably supported by a bearing housing, said drive shaft being drivingly connected to one of said scroll members to cause said scroll members to orbit relative to one another;

a motion controlling member for preventing relative rotation between said first and second scroll members, said motion controlling member including a ring having a plurality of rigid projections; and a biasing member for urging said motion controlling member in a specified direction, said biasing member being in contact with and disposed between said ring of said motion controlling member and a stationary component of said scroll-type machine.

2. The scroll machine according to claim 1 wherein, at least one of said plurality of projections engages said first scroll member and at least one other of said plurality of projections engages said second scroll member.

3. The scroll machine according to claim 1 wherein, at least one of said plurality of projections engages one of said scroll members and at least one other of said plurality of projections engages said bearing housing.

4. The scroll-type machine according to claim 1 wherein, said ring is non-circular.

5. The scroll-type machine according to claim 1 wherein, said specified direction is radially inward.

6. The scroll-type machine according to claim 1 wherein, said specified direction is radially outward.

7. The scroll-type machine according to claim 1 wherein, said specified direction is axially.

8. The scroll-type machine according to claim 1 wherein, said specified direction is torsionally.

9. The scroll-type machine according to claim 1 wherein, said specified direction is generally parallel to a plane defined by said end plate of said second scroll member.

10. The scroll-type machine according to claim 1 wherein, said motion controlling member is disposed within a shell, said biasing member being disposed between said shell and said ring of said motion controlling member.

11. The scroll-type machine according to claim 1 wherein, said biasing member is disposed between one of said scroll members and said ring of said motion controlling member.

12. The scroll-type machine according to claim 1 wherein, said biasing member comprises a cantilever spring.

13. The scroll-type machine according to claim 1 wherein, said biasing member comprises a piston and compressible fluid type of spring.

14. The scroll-type machine according to claim 1 wherein, said biasing member comprises a loop spring.

15. The scroll-type machine according to claim 1 wherein, said biasing member comprises a wishbone spring.

16. The scroll-type machine according to claim 1 wherein, said biasing member comprises a leaf spring.

17. The scroll-type machine according to claim 1 wherein, said biasing member comprises a U-shaped spring.

18. The scroll-type machine according to claim 1 wherein, said biasing member comprises a dashpot.

19. The scroll-type machine according to claim 1 wherein, said motion controlling member is an Oldham coupling.

20. The scroll-type machine according to claim 19 wherein, said Oldham coupling is keyed to said first and second scroll members.

21. The scroll-type machine according to claim 19 wherein, said Oldham coupling is keyed to one of said scroll members and said bearing housing.

22. A scroll-type machine comprising:

a shell;

a first scroll member disposed within said shell and having a first spiral wrap projecting outwardly from an end plate;

a second scroll member disposed within said shell and having a second spiral wrap projecting outwardly from an end plate, said second spiral wrap interleaved with said first spiral wrap to define a plurality of moving fluid chambers therebetween upon relative orbital movement of said scroll members;

a drive shaft rotatably supported by a bearing housing within said shell, said drive shaft being drivingly connected to one of said scroll members to cause said scroll members to orbit relative to one another;

an Oldham coupling for preventing relative rotation between said first and second scroll members, said Oldham coupling including a ring having a plurality of rigid projections; and a biasing member disposed between said shell and said Oldham coupling for urging said Oldham coupling in a specified direction, said biasing member being in contact with and disposed between said ring of said Oldham coupling and said shell.

23. The scroll-type machine according to claim 22 wherein, said Oldham coupling engages said first and second scroll members.

24. The scroll-type machine according to claim 22 wherein, said Oldham coupling engages said bearing housing and one of said first and second scroll members.

* * * * *